US006015088A

United States Patent [19]

Parker et al.

[11] Patent Number: 6,015,088

[45] Date of Patent: Jan. 18, 2000

[54] DECODING OF REAL TIME VIDEO IMAGING

[75] Inventors: James A. Parker, Camillus; Michael A. Ehrhart, Liverpool, both of N.Y.

[73] Assignee: Welch Allyn, Inc., Skaneateles Falls, N.Y.

[21] Appl. No.: 08/964,341

[22] Filed: Nov. 4, 1997

Related U.S. Application Data

[60] Provisional application No. 60/030,360, Nov. 5, 1996.

[51] Int. Cl.[7] .................... G06K 7/10

[52] U.S. Cl. .................... 235/462.01; 382/292

[58] Field of Search .................... 235/462.01, 375, 235/384, 382, 385; 382/183, 291, 292

[56] References Cited

U.S. PATENT DOCUMENTS

| | | | |
|---|---|---|---|
| 4,603,390 | 7/1986 | Mehdipour et al. | 364/467 |
| 4,651,202 | 3/1987 | Arakawa | 358/90 |
| 4,755,873 | 7/1988 | Kobayashi | 358/98 |
| 4,794,239 | 12/1988 | Allais | 235/462.01 |
| 4,908,500 | 3/1990 | Baumberger | 235/384 |
| 5,155,343 | 10/1992 | Chandler et al. | 235/462.09 |
| 5,299,116 | 3/1994 | Owens et al. | 235/385 X |
| 5,304,786 | 4/1994 | Pavlidis et al. | 235/462.07 |
| 5,343,028 | 8/1994 | Figarella et al. | 235/462.09 |
| 5,396,054 | 3/1995 | Krichever et al. | 235/462.1 |
| 5,440,109 | 8/1995 | Hering et al. | 235/384 |
| 5,581,249 | 12/1996 | Yoshida | 340/928 |
| 5,659,167 | 8/1997 | Wang et al. | 235/482.01 |
| 5,703,349 | 12/1997 | Meyerson et al. | 235/472 |
| 5,773,810 | 6/1998 | Hussey et al. | 235/472 |
| 5,796,487 | 8/1998 | Guerra | 356/376 |
| 5,825,006 | 10/1998 | Longacre, Jr. et al. | 235/462 |

*Primary Examiner*—Donald Hajec
*Assistant Examiner*—Diane I. Lee
*Attorney, Agent, or Firm*—Wall Marjama Bilinski & Burr

[57] ABSTRACT

A process allows an image capturing apparatus to be integrated with a personal computer to continuously display a video image of the imaging apparatus. Upon proper input by a user, or automatically after a timed interval, a snapshot of the video image is captured. An autodiscrimination process of the captured video image automatically decodes any bar-coded information present in the captured image and outputs the information.

25 Claims, 6 Drawing Sheets

FIG.10
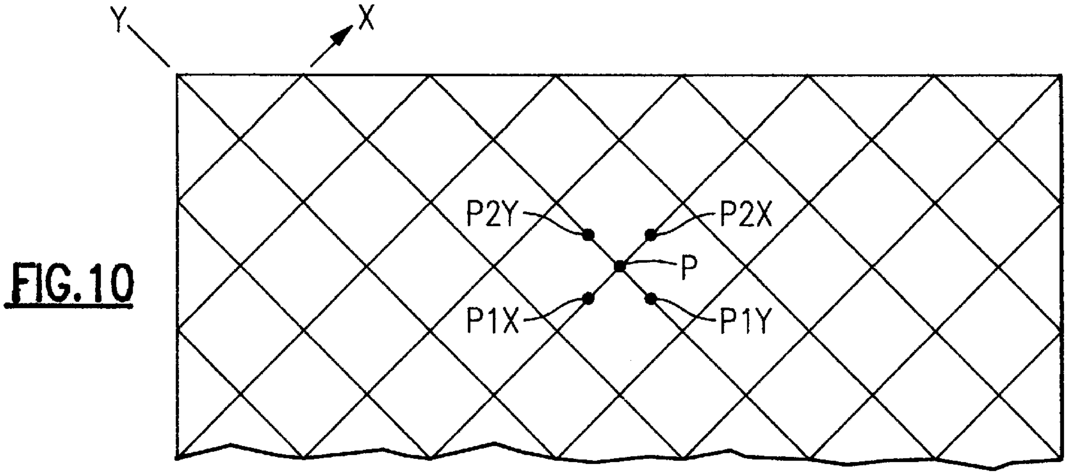
$$A_P = (P2X-P1X)^2 + (P2Y-P1Y)^2$$
FIG.11
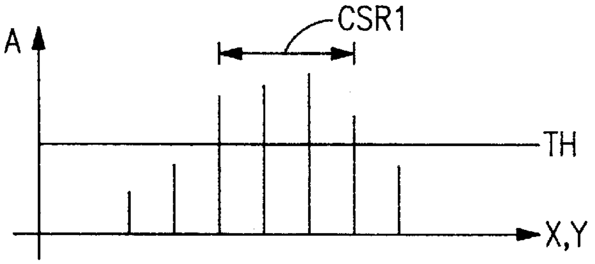
FIG.12
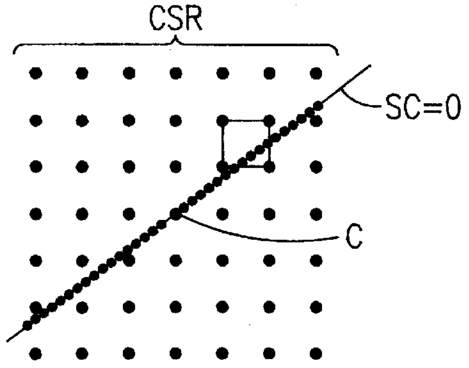
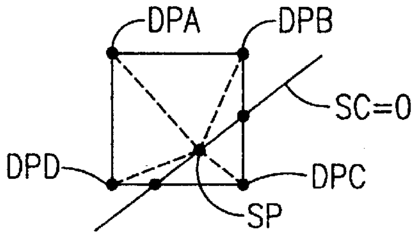
FIG.13
FIG.14
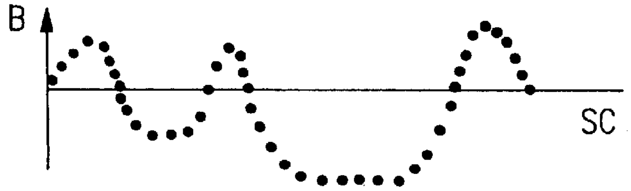

DECODING OF REAL TIME VIDEO IMAGING

This application claims benefit of provisional application 60/030,360, filed Nov. 5, 1996.

FIELD OF THE INVENTION

This invention relates to image capturing apparatus, and more particularly to a method of capturing and decoding bar code information in real time from a continuously displayed video signal of a particular target.

BACKGROUND OF THE INVENTION

Image capture devices are known in the prior art for allowing diagnostic inspections to be performed, such as for surgical or other medical procedures with minimum human intervention. Such devices include video output for allowing real time images of a target of interest to be viewed. Examples of such devices used for medical purposes are described in U.S. Pat. Nos. 4,755,873, and 4,651,202, among others, which allow the image to be continuously viewed on a video monitor. Similar devices, such as borescopes, are used for inspection of steam vessels, automotive engines, and other applications extending into the military, industrial and scientific fields.

In addition, bar code readers are also known for reading 1D and 2D bar code symbols, such as bar coded information in supermarkets, etc. A variety of different bar code symbols are now known, for the 1D bar code symbologies a number of them have been developed to allow the encoding of larger amounts of data, including Code 49, as described in U.S. Pat. No. 4,794,239, issued to Allais, and PDF 417, as described in U.S. Pat. No. 5,340,786, issued to Paviudus, et al. In these patents, stacked symbols partition the encoded data into multiple rows, each including a respective 1D bar code pattern, all or most of which must be scanned and decoded, then linked together to form a complete message. Two dimensional (2D) matrix symbologies, have also been developed which offer orientation-free scanning and greater data densities and capacities than their 1D counterparts. 2D matrix codes encode data as dark or light data elements within a regular polygonal matrix, accompanied by graphical finder, orientation and reference structures.

Bar code readers are known which discriminate between the different types of symbologies of each of the above 1D and 2D types. For example, optical readers capable of 1D autodiscrimination are well known in the art. An early example of such a reader is the SCANTEAM™ 3000, manufactured by Welch Allyn, Inc.

Optical readers which are capable of 1D/2D discrimination are less well known in the art, in that 2D symbologies are relatively new innovations. An example of a hand-held reader having such capability is described in copending, commonly assigned U.S. Ser. No. 08/504,643. A stationary 2D image sensor is described in copending, commonly assigned U.S. Ser. No. 08/516,185, each of which is hereby incorporated by reference in their entirety. Most recently, a barcode reader which performs 1D/2D autodiscrimination of a target having multiple symbols is described in copending and commonly assigned U.S. Ser. No. 08/697,914, filed Sep. 3, 1996. The reader captures a field of view and autodiscriminates between the symbols within the captured field of view.

Typically, if a video image obtained with an image sensor and displayed onto a computer monitor contains bar-coded information, the following occurs: First, the image is captured into a named file saved by the computer, converted to disk or otherwise. The user then must separately load a bar code decoding program such as the 1D/2D program, described above, into the system and load the disk separately as a file for execution by the bar decoding program.

There are a number of problems with this approach. First, if the image is not properly resolved by the digital camera, or other imaging device, then the stored image can not be decoded properly. This means that the user must separately reaim the imaging device, download a new stored image, rename the file, reload the bar code decoding program, and reload the newly stored image as input into the decoding program. Several such iterations might be needed, with each iteration taking a considerable amount of time, and producing frustration and inconvenience for the user.

Furthermore, this situation exacerbates if a target of interest includes widely scattered symbols that are spaced by more than a single field of view, because multiple decoding operations would be required. As noted, each decoding operation would require a separate capture, loading and decoding sequence, as described above. Because of the time required to perform the capture and decoding steps as presently known, efficiency and practicality are each limited.

SUMMARY OF THE INVENTION

It is a primary object of the present invention to overcome the shortcomings of the prior art.

It is another primary object of the present invention to provide a process which utilizes real-time video obtained from a digital camera, endoscope, or other suitable image capturing device for continuous display and integrates the video capability in a computer to assess and decode any bar code readable information found in the video and display the encoded message, while simultaneously displaying the video image.

It is yet another primary object of the present invention to provide a physician, or other practitioner with an opportunity to alter the presentation of the video image or more preferably to aim the device in order to properly place a bar-code readable symbol or symbols into the field of view of the imaging device and without having to separately upload and download the scanning and decoding programs.

It is another primary object of the invention to allow a real-time captured video image to be stored in memory, such as for archival purposes.

It is another primary object of the present invention to allow a variety of various imaging devices of varying types, such as endoscopes, borescopes, and literally any digital camera capable of providing video input to a PC, to be interchangeably used with the above, irrespective of the types of imaging optics or illumination systems used therein.

It is another primary object of the present invention to provide a system which can automatically and without human intervention capture and decode a video input while allowing the real time image to remain displayed.

Therefore, and according to a preferred aspect of the present invention a process is provided for capturing and decoding bar-code information in real-time from a continuously displayed video signal, comprising the steps of:

aiming an imaging apparatus at a target of interest, said target having optically readable and machine readable information contained thereupon;

continually displaying a real time image of said target from said imaging apparatus on a computer video monitor;

selectively capturing an image into the memory of said computer;

decoding said image if said bar-code readable information is contained on said real-time image while maintaining said image on said display; and outputting the decoded information.

According to a preferred embodiment, a captured image with or without bar-code data can be saved such as for archival purposes.

This application deals with integrating software which allows a personal computer (PC) or other peripheral device to be linked with literally any form of image capturing apparatus, such as an endoscope or other medical or other diagnostic instrument having a solid-state imaging device. A video image from the imaging device is displayed on the PC monitor while the system automatically captures the image, scans the image, and decodes and displays an encoded message, if such information is present.

The device is most useful for physicians or others who use endoscopic or other diagnostic instruments having video capability. The present process allows a real-time video image to be repeatedly and selectively captured to allow automatic decoding and outputting of encoded information. Furthermore, the user can conveniently aim, capture and decode in a single operation.

Other objects, features, and advantages will become apparent form the following Detailed Description of the Invention, when read in combination with the accompanying drawings.

BRIEF DESCRIPTION OF THE DRAWINGS

FIGS. 6 through 9 show representative bar code symbols of types which may be decoded by the present invention;

FIGS. 10 through 14 are drawings which aid in the understanding of the flow chart of FIG. 4;

DETAILED DESCRIPTION OF THE INVENTION

Figure 1:
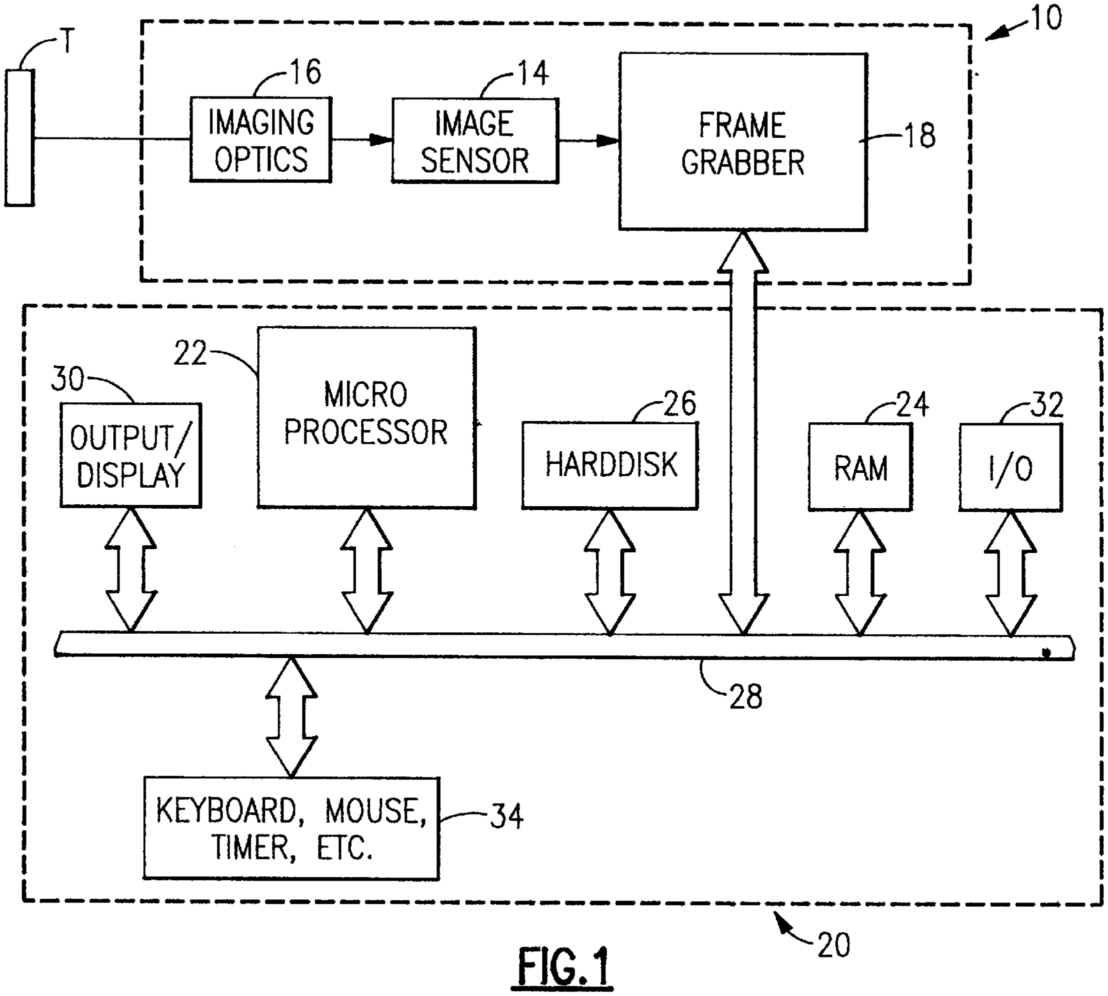
FIG. 1 is a block diagram of a preferred embodiment of the present invention.
Figure 3:
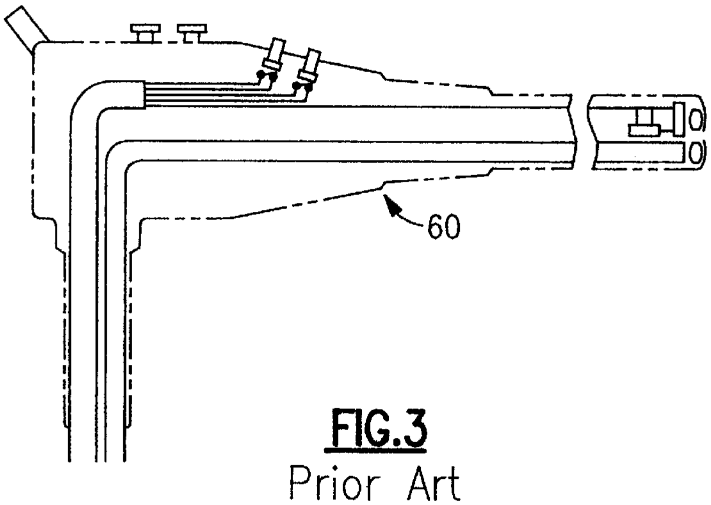
FIG. 3 is a perspective view of one embodiment of a bar code reader which is used with the present invention.

Referring to FIG. 1, there is shown a block diagram according to a preferred embodiment of the present invention. An imaging assembly 10 is provided for receiving an image of an object T and generating an electrical output signal indicative of the data optically encoded thereon, if any. The imaging assembly 10 may include an image sensor 14, such as a 1D or 2D CCD or CMOS solid state image sensor together with an imaging optics assembly 16 for receiving and focusing an image of the object T onto a substrate of the image sensor 14. Particular assemblies of this type are described in U.S. Pat. Nos. 4,755,873, and 4,651,202, each of which are incorporated by reference. It will be readily apparent from the description of the invention, however, that literally any device having an internal image sensor is applicable. For purposes of this application, an electronic endoscope 60, such as described in the '202 reference is shown in FIG. 3.

The imaging device 14 also includes electronics which allow interfacing with a video capture card, also referred to as a frame grabber 18, which interfaces directly with a computer 20. According to this embodiment, the computer 20 is a Compaq Pentium 120 based PC and the frame grabber 18 is a Flashpoint Lite manufactured by Integral Technologies, Inc. These items are each well known in the art and require no further detailed discussion.

The computer includes a microprocessor 22 which is a programmable control device which is able to receive, output and process data in accordance with a stored program maintained within either or both of a read/write random access memory (RAM) 24 and a hard drive 26. The described embodiment preferably refers to a computer having the Microsoft Windows operating system contained therein, though other similar systems can be utilized.

The RAM 24 and the hard drive 26 are both connected to a common bus 28 through which program data, including address data, may be received and transmitted in either direction to any circuitry that is also connected thereto.

Included along the common bus 28 are user inputs, such as a keyboard/ mouse arrangement 34 as well as a video monitor 30 used to output the video signal, as is described in greater detail below.

The overall operation of the system illustrated in FIG. 1, will now be described with reference to the main program represented by the flow chart of FIG. 2.

Figure 2:
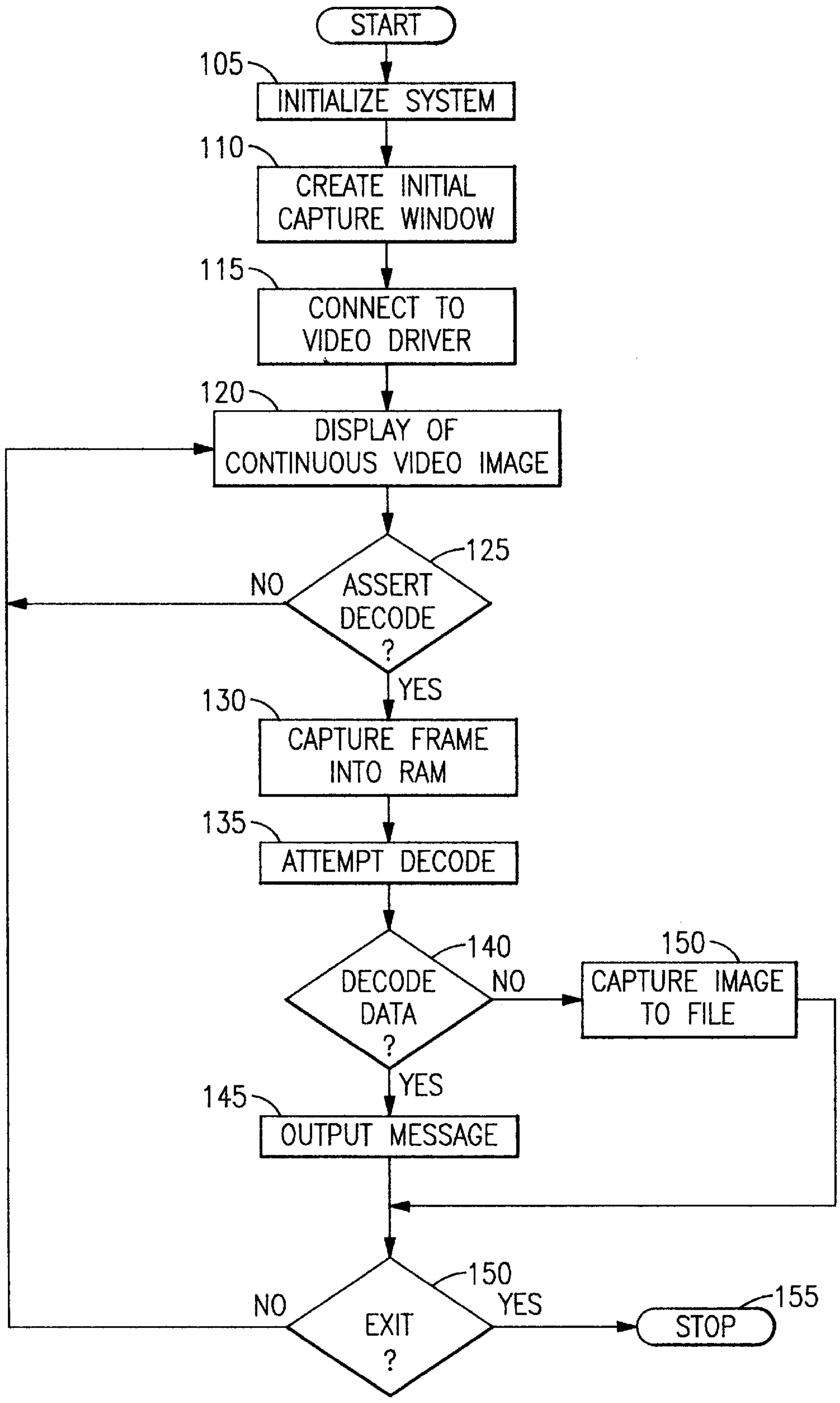
FIG. 2 is a flow chart of the major process using a bar code reader and in accordance with a preferred aspect of the present invention.

Referring to FIG. 2, the main program begins with block 105 which includes the activation of the program instructions which can be accomplished by calling up the program from the hard drive 26 and loading the program into the system using the standard Windows commands from either the file manager or otherwise as is known. Upon loading of the program, a set of system parameters defining initial sizes of the frame window for the framegrabber 18, and other software variables, such as the mode of decoding, of triggering, etc are each activated. Each of the above parameters are described in greater detail in the attached source code, attached as microfiche Appendix I, attached hereto, in accordance with 37 CFR §1.96.

In the initial start-up mode, a particular user input is selected as the trigger for the image capture and decode mechanism. According to this embodiment, a designated keyboard key, referred to as a "Hotkey", such as F10, is preset as the trigger. Alternately, the user can be prompted as described in greater detail according to the source code, see microfiche Appendix I, to utilize other keys on the keyboard or the mouse button as the trigger. Another alternate mode can be used in which a snapshot can be taken automatically by the processor 22 after a predetermined time interval has elapsed, e.g. 2 seconds. Similarly, the initial startup mode provides for outputting of any decoded messages to the monitor 30 after all of the symbols found have been decoded, such as adjacent the video image in a Windows message box. Alternate outputting modes, however, are contemplated allowing for several options for the user, such as saving to a ASCII file, sending the messages to a host processor, a keyboard buffer, or other convenient means.

The imaging assembly 10, using the imaging optics 16 focusses an image of the target T onto the image sensor 14 as is commonly known. The image of the target is then converted into analog electrical signals which are transmitted to the frame grabber 18 having circuitry to perform the analog to digital conversion to provide an array of pixels as defined by default parameters which is displayed as a continuous video signal in the monitor 30 per block 120. Details relating to the above are generally known to those of skill in the field, and require no further elaboration herein. The frame grabber 18 is preferably supplied as an input card to the computer 20 and serves as the video driver, though the frame grabber 18 can also be more than one driver, also as is commonly known.

Referring to the flow chart of FIG. 2, and after the video image of the target has been supplied by the image sensor to the monitor 30 per block 120, the user per block 125 is ready to capture an instantaneous image (hereinafter referred to as a "snapshot") for storage into RAM 24 per block 130 and for attempting to decode any symbols present in the field of view per block 135. As noted above, the initial mode contemplates the user must elect the capture of a snapshot using the Hotkey, F10, to execute block 125, though as also noted above, a number of alternate modes are available by which the user or the processor 22 may capture a snapshot. Regardless of the mode selected, the user aims the image sensor 16 at the object T until a resolved image is displayed in the monitor 30. Upon depression of the "hotkey", the processor 22 proceeds automatically to blocks 130 and 135, which call for the capture and attempt to decode an instantaneous image of the signal, referred to hereafter as a "snapshot", referring to an instantaneous digital signal which is stored into RAM. In passing, it should be noted that the acquisition of the snapshot of the video image does not impact the video image which remains displayed on the monitor, as a real time image.

Image capture of the snapshot to RAM 24 automatically causes the processor 22 to attempt to decode the snapshot as shown in the blocks 130, 135 in FIG. 2. This decoding involves a discrimination process, depending on whether any 1D and or 2D symbols are present in the field of view. This autodiscrimination process is described in greater detail below. If the decoding is successful, per the decision block 140, the messages are outputted per block 145. If the attempt to decode the messages is unsuccessful, the user may opt to recapture the video signal per block 125, and block 145 is bypassed. The user may alternately elect to store the captured image per block 150, into the hard disk 26.

Figure 4:
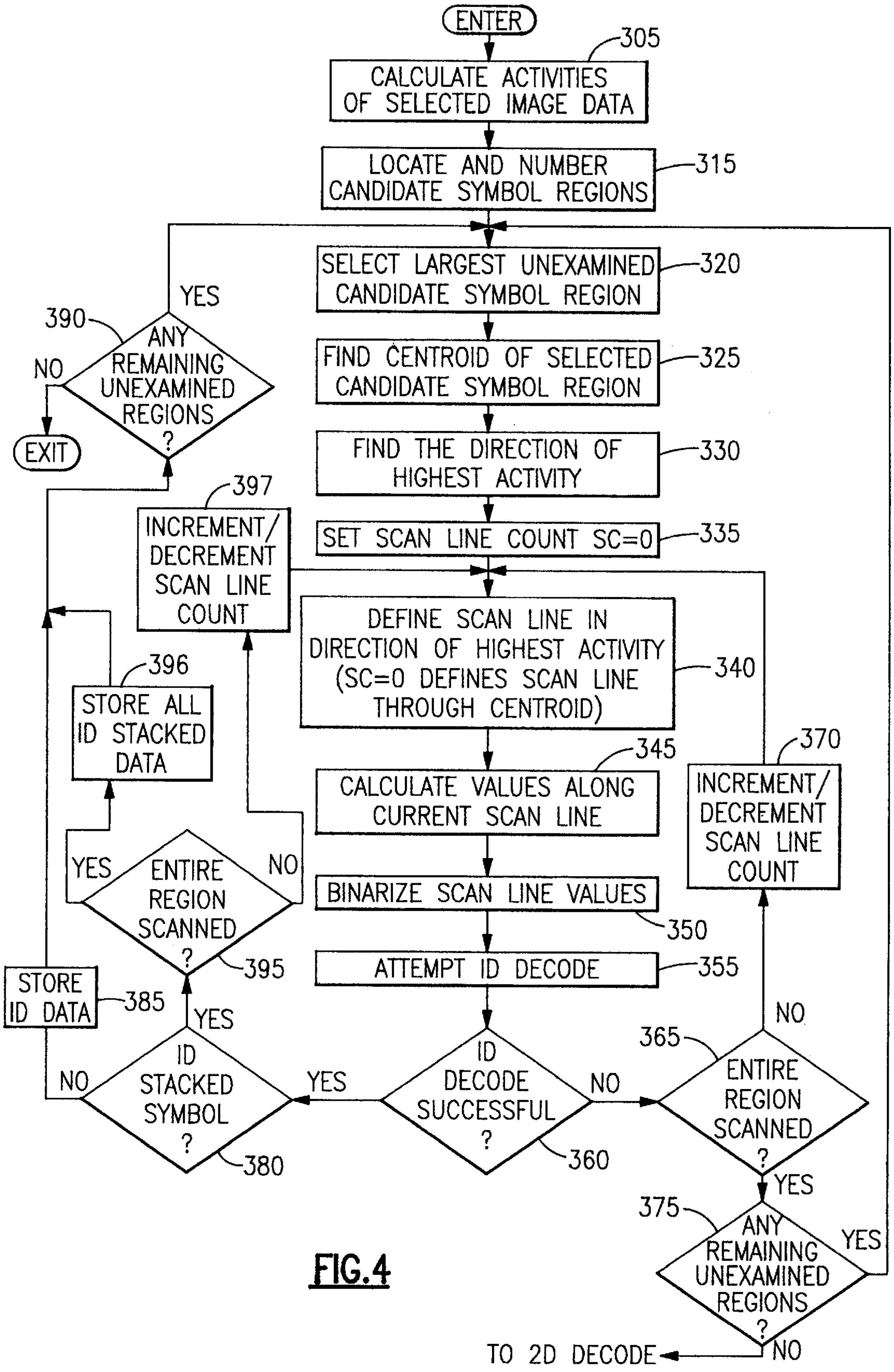
FIG. 4 is a flow chart of one embodiment of the 2D portion of the autodiscrimination process according to the invention.
Figure 5:
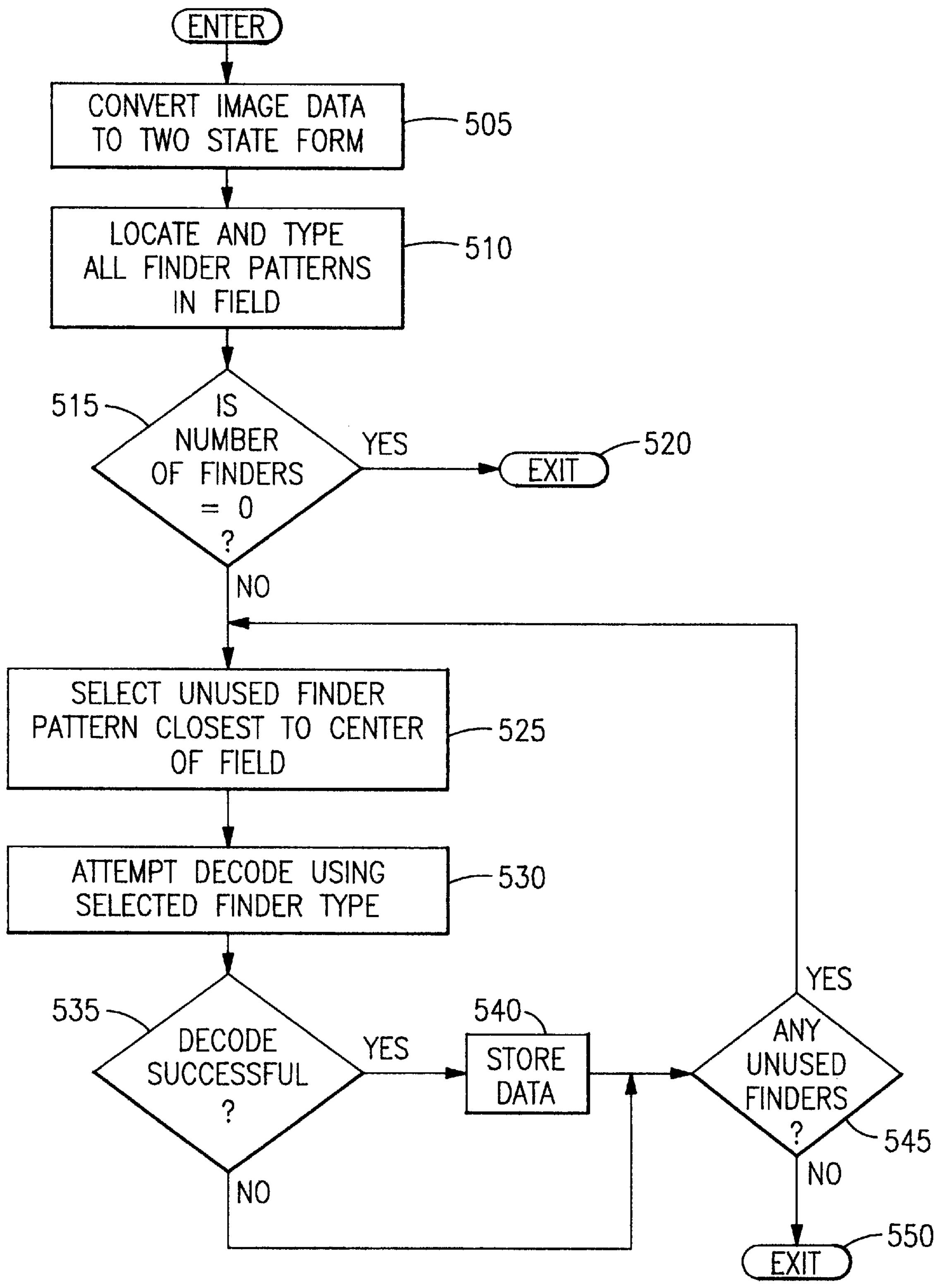
FIG. 5 is a flow chart of one embodiment of the 1D portion of autodiscrimination program of the invention.

Generally speaking, the flow chart of FIG. 4 illustrates the 1D portion of a complete 1D/2D autodiscrimination process, while FIG. 5 illustrates the 2D portion of the complete 1D/2D autodiscrimination process.

Turning first to the flow chart of FIG. 4, there is shown the 1D portion of the autodiscrimination process, which operates on the image data stored in RAM 24. The image data will comprise a gray scale representation of the 2D image formed on the image sensor.

On encountering block 305, the processor 22 is directed to calculate the "activities" of selected image data elements. The "activity" of a point P as used herein comprises a measure of the rate of change of the image data over a small two dimensional portion of the region surrounding point P. This activity is preferably calculated along any two arbitrarily selected directions which are mutually perpendicular to one another, as shown by the lines parallel to directions X and Y of FIG. 10. One example of an activity calculation is that which is based on the squares of the gray scale differences of two pairs of points P1X–P2X and P1Y–P2Y that are centered on point P, as shown in FIG. 10. Two mutually independent directions are used because the orientation of the symbol is unknown and because a high activity level that by chance is difficult to detect in a first direction will be readily detectable in a second direction perpendicular to the first direction.

Preferably, an activity profile of the stored image data is constructed on the basis of only a selected, relatively small number of image data elements that are distributed across the field of view that corresponds to the stored image data. Using a relatively small number of data elements is desirable to increase the speed at which the symbol can be imaged. These selected points may be selected as the points which lie at the intersections of an X-Y sampling grid such as that shown in FIG. 10. The spacing of the lines defining this grid is not critical to the present invention, but does affect the resolution with which the activity profile of the image can be measured.

When the processor 22 has determined the activities of the selected data points, it is directed to block 315, which causes it to look for candidate bar code symbols by identifying regions of high activity. This is conveniently done by determining those sets of image data points having activities which exceed a predetermined threshold value. A simplified, one-dimensional representation of this step is illustrated in FIG. 11, wherein those image data points having an activity that exceed a threshold value TH are labeled as a candidate symbol region CSR1.

In embodiments which are adapted to find and decode all of the symbols that occur in fields of view that include a plurality of bar code symbols, the result is the identification of a plurality of candidate symbol regions (CSRs), any one or more of which may be a bar code symbol. Whether or not they are bar code symbols is determined on the basis of whether they are decodable. According to this embodiment, the processor is instructed to select one of the CSRs according to a suitable selection rule, such as the largest CSR first, the CSR nearest the center of the field of view first, the CSR with the highest total activity first, etc., and then attempt to decode each of the symbols, to attempt to decode the first symbol and stop, depending on whether or not the symbol has been decoded.

Once all of the CSRs have been located, the processor 22 is directed to block 320 which, calls for the processor to select the largest (or most centrally located) as yet unexamined CSR for further processing, and then to proceed to block 325. This latter block then causes the processor 22 to find the centroid or the center of gravity of that CSR, before proceeding to block 330. An example of such a centroid is labeled C in FIG. 12. Because the steps involved in finding a centroid or center of gravity are well known, they will not be described in any detail herein.

On encountering block 330, the processor 22 is directed to examine the selected CSR by defining exploratory scan lines therethrough, determining the activity profile of the CSR along those scan lines, and selecting the scan line having the highest total activity. In the case of a 1D bar code symbol, this will be the direction most nearly perpendicular to the direction most nearly perpendicular to the direction of the bars, i.e., the optimum reading direction for a 1D symbol.

On exiting block 330, the processor 22 encounters blocks 335 and 340. The first of these blocks 335 scans a scan line counter to zero; the second block 340 defines an initial working scan line through the centroid in the previously determined direction of highest activity. The result of this operation is the definition, in the image data space representation of the CSR, of a working scan line, such as SC=0 in FIG. 12.

Once the initial scan line has been defined, the processor 22 is directed to block 345 to calculate, by interpolation from the image data of the CSR, the values of the sampling points that lie along this scan line. This means that, for each sampling point on the initial scan line, the processor 22 will calculate what brightness the sampling point would have if its brightness were calculated on the basis of the weighted brightness contributions of the four nearest brightness points of the CSR. These contributions are illustrated by the dotted lines which join the sample point SP of FIG. 13 to the four nearest image data points DPA–DPD. So long as these sampling points are more closely spaced than the image data points, this interpolation procedure will be performed on a subpixel basis, and this will produce a usably accurate representation of the image data along the scan line. The result of the subpixel interpolation of the sampling points on a representative scan line of this type is shown in FIG. 14. Because the particulars of the subpixel interpolation process are known to those skilled in the art, this process will not be further described herein.

Once the above-described scan line data has been calculated, the processor 22 is directed to block 350, which calls for it to binarize the scan line data, i.e., convert it to a two-state representation of the data which can be processed as a candidate for 1D decoding. One such representation is commonly known as a timer count representation. One particularly advantageous procedure for accomplishing this binarization process is disclosed in U.S. Pat. No. 5,586,960, which is hereby incorporated by reference.

On exiting block 350, the processor 22 will be in possession of a potentially decodable two-state 1D representation of the CSR. It then attempts to decode this representation, as called for by block 355. This attempted decoding will comprise the trial application to the representation of one 1D decoding program after another until the latter is either decoded or determined to be undecodable. Because decoding procedures of the latter type are known to those skilled in the art, they will not be discussed in any further detail.

As the 1D autodiscrimination process is completed, the processor 22 is directed to decision block 360 which causes it to continue along one of two different paths, depending on whether or not decoding was successful. If the decoding was not successful, the processor 22 will be caused to loop back to block 340, via blocks 365 and 370, where it will be caused to generate a new scan line SC=0, but that passes either above or below centroid C. This looping back step may be repeated many times, depending on the "spacing" of the new scan lines, until the entire CSR has been examined for decodable 1D data. If the entire CSR has been scanned and there has been no successful decode, the processor 22 is directed to exit the above-described loop via block 375. As used herein, the term "parallel" is broadly used to refer to scan lines or paths which are similarly distorted (e.g. curvilinear) as a result of foreshortening effects or as a result of being imaged from a non-planar surface. Since compensating for such distorting effects is known, as indicated, for example, by U.S. Pat. No. 5,396,054, it will not be discussed in further detail.

Block 375 serves to direct the processor 22 back to block 320 to repeat the above-described selection, scanning and binarizing steps for the next unexamined CSR, if one is present. If another CSR is not present, or if the processor's program calls for an attempt to decode only one CSR, block 375 causes the processor 22 to exit the flow chart of FIG. 4 to begin an attempt to decode the then current set of image data as a 2D symbol, in accordance with the flow chart of FIG. 5. If other CSRs are present, block 375 directs the processor 22 back to block 320 to repeat the selection, scanning and binarizing process to the next CSR, and the next, and so on, until there is either a successful decode (block 360) or all of the CSRs have been examined (block 375).

Figures 6, 7, 8, 9:
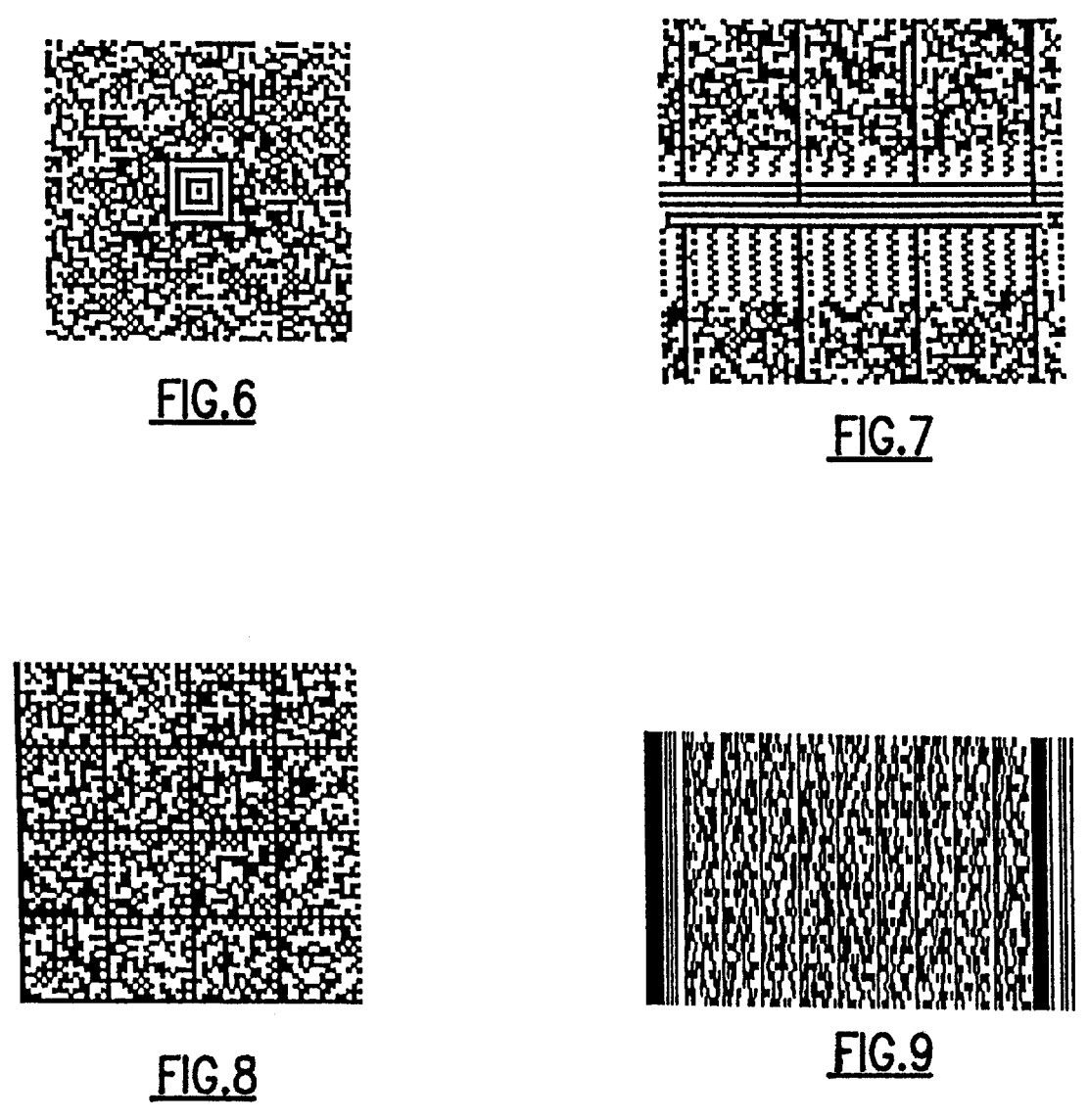

If the processing of the first CSR has resulted in a successful decode, block 360 directs the processor 22 to block 380, which causes it to determine whether the decoded data indicates that the CSR contains a 1D stacked symbol, such as a PDF417 symbol. One example of such a symbol is shown in FIG. 9. If it is not, i.e., if the decoded symbol includes only a single row of bars, the 1D data is stored for later outputting in accordance with block 145 of the main program of FIG. 2, as called for by block 385. Alternately, the data may be output immediately and block 145 later skipped over. Then, if there are no remaining unexamined CSRs, the processor is directed to exit the flow chart of FIG. 4 via block 390. If, however, there are CSRs remaining, block 390 will direct the processor back to block 320 to begin processing the next CSR, and the next, and so on until all CSRs have been examined and decoded (block 390) or examined and found to be undecodable (block 375).

If, on encountering block 380, the decoded data indicates that the CSR contains a 1D stacked symbol, the above-described processing is modified by providing for the repetition of the scanning-digitizing process, beginning with block 340. This is accomplished by blocks 395, 396, and 397 in a manner that will be apparent to those skilled in the art. Significantly, by beginning the repeating of the process at block 340, all additional scan lines defined via the latter path will be parallel to the first decodable scan line, as required by a 1D stacked symbol, at least in the broad sense discussed earlier.

In view of the foregoing, it will be seen that, depending on the number of CSRs present, the flow chart will cause all 1D symbols in the image data to either be decoded or found to be undecodable before directing the processor 22 to exit the same.

The 2D autodiscrimination flow chart of FIG. 5 may be processed after the processing of the 1D autodiscrimination flow chart of FIG. 4 has been completed. It may also be processed without the flow chart of FIG. 4 having been processed, i.e., the 1D portion of the 1D/2D autodiscrimination process may be skipped or by passed. (In principle, the steps of the 2D portion of the 1D/2D discrimination process (FIG. 5) may also be processed before the 1D portion thereof (FIG. 4). Such arrangements are well within the intended scope of the present invention.

Referring to FIG. 5, there is shown a flow chart of the 2D portion of the 1D/2D autodiscrimination process. When the flow chart of FIG. 5 is entered, the image data that is stored in RAM 24 is the same as that which would be stored therein if the flow chart of FIG. 4 were being entered. This data will comprise an array of 8-bit gray scale image data elements produced by the image sensor 16 and its associated signal and processing and A/D converter circuits contained in the framegrabber 18.

The flow chart of FIG. 5 begins with a block 505, which directs the processor 22 to convert the gray image data representation stored in RAM 24 into a two-state or binarized representation of the same data. This may be accomplished in generally the same manner described earlier in connection with FIG. 11, i.e., by comparing these gray scale values to a threshold value and categorizing these values as 1s or 0s, depending on whether they exceed that threshold value.

Once the image data has been binarized, the processor 22 continues on to block 510, which causes it to identify and locate all of the 2D finder patterns that appear in the field of view of the image data. This is preferably accomplished by examining all of the candidate 2D finder patterns (CFPs) that are present and identifying them by type, i.e., identifying whether or not they are bulls eye type finder patterns, waistband type finder patterns or peripheral type finder patterns. An example of a bulls eye type finder pattern is shown in the central portion of the 2D bar code symbol of FIG. 6, which symbol encodes data in accordance with a 2D matrix symbology named "Aztec". An example of a waistband type finder pattern is shown in the middle portion of the 2D bar code symbol of FIG. 7, which symbol encodes data in accordance with a 2D matrix symbology named "Code One". An example of a peripheral type finder pattern is shown in the left and lower edges of the 2D bar code symbol of FIG. 8, which symbol encodes data in accordance with a 2D matrix symbology known as "Data Matrix". The finder identification processing is performed by applying to each CFP, in turn, a series of finder pattern finding algorithms of the type associated with each of the major types of finder patterns. Since such finder finding algorithms are known for finders of the waistband and peripheral types, these algorithms will not be discussed in further detail. One example of a finder finding algorithm for a waistband type finder may be found, for example, in "Uniform Symbology Specification Code One", published by AIM/U.S.A. Technology Group. Finder finding algorithms for bulls eye type finders that include concentric rings, (e.g. MaxiCode) are also known and therefore will also not be described in further detail.

Particularly advantageous for purposes of this embodiment, is a bulls eye finder finding algorithm of the type that may be used both with 2D symbologies, such as MaxiCode, that have bulls eye finder patterns that include concentric rings and with 2D symbologies, such as Aztec, that have bulls eye finder patterns which include concentric polygons. A finder finding algorithm of the latter type is described in described in copending and commonly assigned U.S. Ser. No. 08/504,643, which has been incorporated herein by reference. The Aztec 2D bar code symbology itself is fully described in U.S. Ser. No. 08/441,446, which has also been incorporated by reference.

Once all of the finder patterns have been located and their types have been determined, the processor 22 is directed to decision block 515. This block affords the processor an opportunity to exit the flow chart of FIG. 5, via exit block 545, if no 2D finder patterns could be found and typed. This block speeds up the execution of the program by skipping over decoding operations which have no hope of success without their associated finder pattern.

If a finder pattern has been found and typed, the processor 22 is directed to block 525. This block causes the processor 22 to select for decoding the bar code symbol whose finder is closest to the center of field of view of the image data. Optionally, the processor may be instructed to find the largest 2D bar code symbol that uses a particular 2D symbology or the 2D bar code symbol using a particular 2D symbology which is closest to the center of the field of view of the image data. Once this selection is made, the processor attempts to decode that symbol, as called for block 530. If this decoding attempt is successful, as determined by decision block 535, the resulting data may be stored for outputting in accordance with block 135 of the main program of FIG. 2, as called for by block 540. Alternately, the decoded data may be outputted immediately and block 135 later skipped over. If the decoding attempt is not successful, however, block 540 is skipped, and the processor 22 is directed to decision block 545.

Block 545 will direct the processor 22 back to block 525 to process the next 2D symbol, i.e., the symbol whose CFR is next closest to the center of the field of view. The above-described attempted decoding and storing (or outputting) steps will then be repeated, one CFR after another, until there are no more symbols which have usable finder data patterns. Finally, when all symbols having usable finder patterns have either been decoded or found to be undecodable, the processor will exit the flow chart of FIG. 5, via block 550, to return to the main program of FIG. 2.

All of the decoded messages are then outputted to the monitor 30, and the entire output is displayed. According to this embodiment, the contents of each of the bar code messages are output to the WINDOWS message box, though other alternatives are possible.

The invention has been described with reference to a specific embodiment, but it will be readily apparent that other similar embodiments can be utilized to provide decoding and outputting of a real time video signal and as covered by the accompanying claims.

We claim:

1. A process for capturing and decoding bar-code information in real time from a continuously displayed image video signal, comprising the steps of:

aiming an imaging apparatus at a target of interest, said target having at least one of optically readable and bar coded information contained thereupon;

continually displaying a real time image of said target from said imaging apparatus;

selectively capturing and storing an instantaneous image of said target into the memory of a computer;

determining if bar-coded information is present in said stored image;

decoding bar-code information if bar-code readable information is contained on said instantaneous stored image while maintaining the display of said real-time image; and outputting the decoded bar-coded information.

2. A process as recited in claim 1, wherein said selective capturing step is performed automatically after a predetermined time interval.

3. A process as recited in claim 1, wherein said capturing step is selectively performed by input supplied through input means linked to said imaging apparatus.

4. A process as recited in claim 3, wherein said input means is a keyboard.

5. A process as recited in claim 3, wherein said input means is a mouse.

6. A process as recited in claim 3, wherein said input means is a signal from one of at least one of an external, remote and host device.

7. A process as recited in claim 1, including the step of outputting said decoded information adjacent said real-time displayed image.

8. A process as recited in claim 1, including the step of outputting said decoded information to a computer file.

9. A process as recited in claim 1, including the step of outputting said decoded information to a computer keyboard buffer.

10. A process as recited in claim 1, including the step of outputting wherein said decoded information to a pop-up dialogue box.

11. A process as recited in claim 1, including the step of outputting said decoded information to an application's clipboard.

12. A process as recited in claim 1, including the step of integrating said process with an external software application and outputting said decoded information to said application.

13. A process as recited in claim 1, including the step of storing captured images in which at least some of said images include bar code information.

14. A process for capturing and decoding bar-coded information in real time from a continuously displayed video signal of a target of interest, said process comprising the steps of:

aiming an imaging apparatus at a target of interest;

continually displaying a real time image of said target obtained from said imaging apparatus;

selectively capturing an instantaneous displayed image of said target and storing said image into computer memory;

determining if bar-coded information is present in said captured and stored image;

decoding all bar-coded information present in said captured and stored image while continually displaying said real time image of said target; and outputting the decoded bar-code information onto said real time displayed image.

15. A process as recited in claim 14, wherein said selective capturing step further includes the step of automatically capturing said instantaneous image after a predetermined time interval.

16. A process as recited in claim 14, wherein said target contains an indeterminate number of bar-coded segments disposed indiscriminately throughout, said process including the further steps of:

identifying all bar-coded information in the field of view of said captured image;

decoding all bar-coded information segments found in said captured image; and outputting the decoded bar-coded information of each segment onto said real-time displayed image, wherein the bar-coded information can include distinct 1D and 2D symbologies.

17. A process as recited in claim 14, wherein said capturing step includes the step of selectively inputting a capture signal to said imaging apparatus.

18. A process as recited in claim 14, including the step of outputting said decoded information to a computer file.

19. A process as recited in claim 14, including the step of outputting said decoded information to a pop-up dialogue box which is displayed.

20. A process as recited in claim 14, including the step of additionally storing said captured images and decoded bar-coded information into memory after said outputting step.

21. A process as recited in claim 20, wherein said storing step includes the storing of images regardless of whether bar-coded information has been determined during said determining step.

22. Apparatus for capturing and decoding bar-coded information from a target of interest comprising:

imaging means for imaging a target of interest, said target having at least one of optically readable and bar-coded information contained therein;

processing means for processing an imaged target;

display means for continually displaying a real-time image of said target from said imaging and processing means;

image capture means for selectively capturing at least one image displayed by said display means;

scanning means for scanning said at least one captured image and for determining the presence of bar-coded information in the field of view of said at least one captured image;

decoding means for decoding any bar-coded information detected by said scanning means; and output means for outputting the decoded bar-coded information to said display means.

23. Apparatus as recited in claim 22, including discrimination means for discriminating the type of bar-coded information present in said at least one captured image.

24. Apparatus as recited in claim 22, including input means connected to said image capture means for inputting a signal to operate said scanning means and said decoding means when an image is captured.

25. Apparatus as recited in claim 22, including storage means for selectively storing images captured by said image capture means regardless of whether bar-coded information is present.

* * * * *